United States Patent [19]

Adler et al.

[11] 3,904,369

[45] Sept. 9, 1975

[54] METHOD AND APPARATUS FOR CONTROLLING THE TEMPERATURE OF A TAPE

[75] Inventors: Stanford L. Adler, Monsey; William J. Calogero, Hopewell Junction, both of N.Y.

[73] Assignee: Technicon Instruments Corporation, Tarrytown, N.Y.

[22] Filed: June 1, 1973

[21] Appl. No.: 366,236

[52] U.S. Cl. .................. 23/230 R; 23/259; 118/101; 118/268

[51] Int. Cl.[2] .................. G01N 33/16; B05C 11/105

[58] Field of Search .............. 23/230 R, 253 R, 259; 117/3; 118/65–68, 101, 106, 268, 401, 405

[56] References Cited

UNITED STATES PATENTS 3,240,664 3/1966 Earle .............................. 162/184 X

*Primary Examiner*—Morris O. Wolk
*Assistant Examiner*—Timothy W. Hagan
*Attorney, Agent, or Firm*—S. P. Tedesco; S. E. Rockwell

[57] ABSTRACT

Method of controlling the temperature of a tape element in a tape run utilizing a tape support element having a surface elongated in the direction of the tape run and for coaction with a surface of the tape element, the tape support surface having a tape-receiving part spaced from a tape delivery part, which method includes controlling the temperature of the tape support surface. The method includes the steps of intimately supporting the tape element by the support element, and introducing a relatively small quantity of a temperature-exchange liquid between the aforementioned elements in proximity to the tape receiving part to spread by capillarity in a thin film toward the tape delivery part. Such spreading of the thin liquid film is enhanced by moving the tape element toward the delivery part of the support.

10 Claims, 3 Drawing Figures

PATENTED SEP 9 1975 3,904,369

METHOD AND APPARATUS FOR CONTROLLING THE TEMPERATURE OF A TAPE

BACKGROUND OF THE INVENTION

1. Field of the Invention

This invention relates to a method of controlling the temperature of a tape in a tape run, and relates more particularly to controlling such temperature for a temperature-responsive reaction in the tape or in material supported from the tape.

2. Prior Art

In Adler U.S. Pat. No. 3,650,698 issued Mar. 21, 1972 there is illustrated and described apparatus for the determination of coagulation times of human blood specimens. Each specimen is deposited on a tape which travels over a temperature-controlled support for a temperature-responsive reaction with a reagent deposited on the tape. In use of such apparatus, it has been found, when the tape support is heated to raise the temperature of the substances carried by the tape, that heat losses occurred owing to an unevenness of contact of the tape with the support and owing to the insulating characteristic of any air gap between the tape and the support.

We have found that the air gap between the tape and the support may be employed for its capillary action to draw a film of a temperature-exchange liquid between the tape and the support to displace the air for more effective temperature transfer. Moreover, the liquid film draws the tape down on the support to conform to the shape of the latter which is preferably flat. Another advantage is that the spreading of the liquid film, due in the first instance to capillary action, is enhanced by moving the tape over the support. By controlling or limiting the film surface area of the support in contact with the tape, as by lands on the support extending lengthwise of the tape and spaced apart transversely of the tape, we find that we can determine the desirable extent of adhesion of the tape to the support, while enabling the tape to move over the support.

SUMMARY OF THE INVENTION

One object of the invention is to provide an improved method of controlling the temperature of a tape element in a tape run for a temperature-responsive reaction in the tape element or material carried thereby. It also contemplates, utilizing a tape support element having a surface elongated in the direction of the tape run and for coaction with a surface of the tape element, the tape support surface having a tape-receiving part spaced from a tape delivery part, a method which includes controlling the temperature of the tape support surface. The method includes the steps of intimately supporting the tape element by the support element, and introducing a relatively small quantity of a temperature-exchange liquid between the aforementioned elements in proximity to the tape receiving part to spread by capillarity in a thin film toward the tape delivery part. Such spreading of the thin liquid film is enhanced by moving the tape element toward the delivery part of the support. The filmed support surface in contact with the tape element is restricted to reduce adhesion of the tape to the support element by grooves which provide lands on the support extending lengthwise of the tape element and spaced apart transversely thereof.

DETAILED DESCRIPTION OF THE PREFERRED EMBODIMENT

Figures 1, 2, 3:
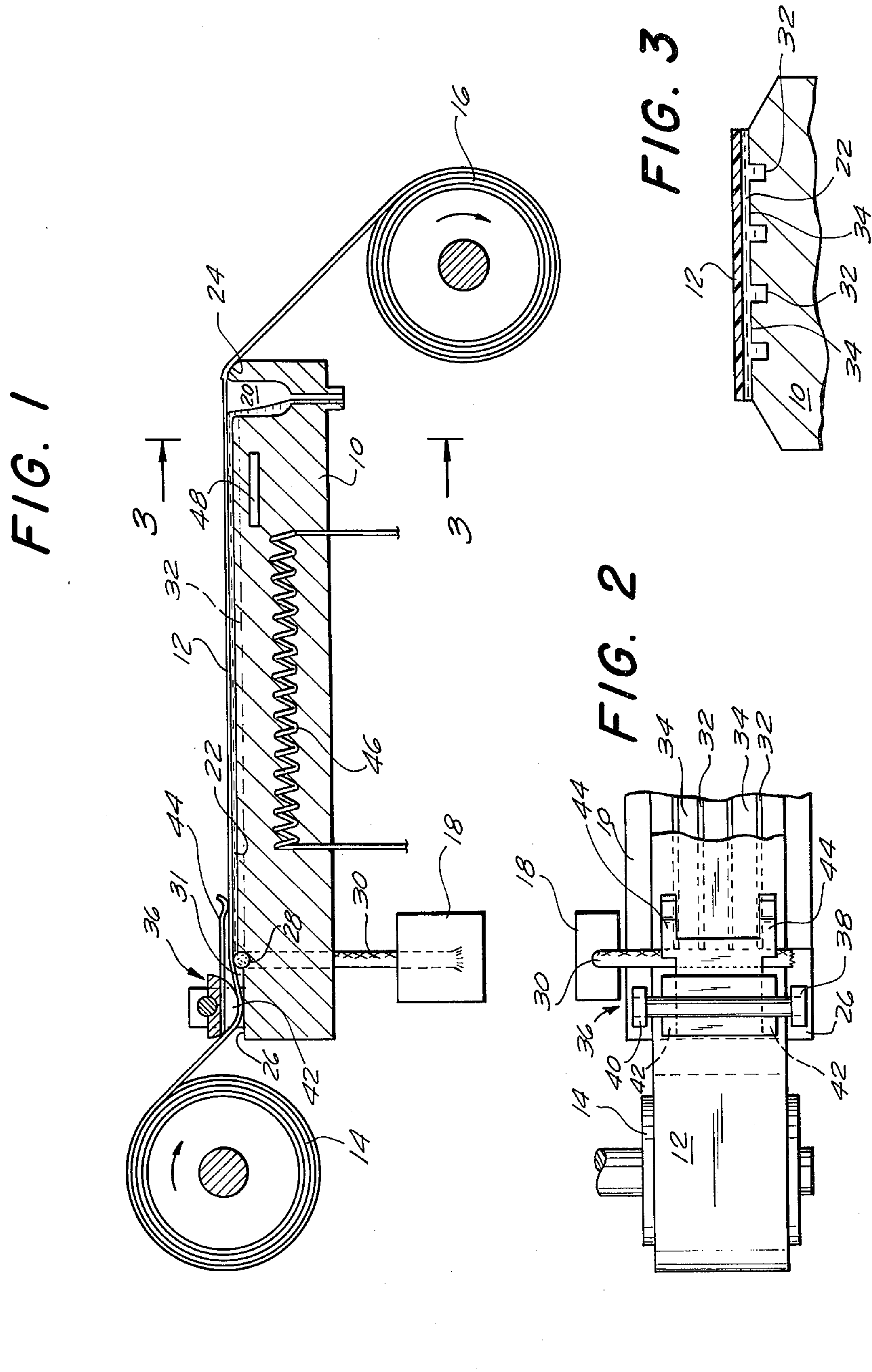
FIG. 1 is a side elevational view in section of apparatus embodying the invention.
FIG. 2 is a fragmentary top plan view of the apparatus.
FIG. 3 is a fragmentary sectional view taken on line 3—3 of FIG. 1.

In general, the illustrated form of the invention includes a temperature-controlled tape support element 10 over which travels a tape 12 supplied as from a roll 14 and taken up by a driven roll 16. A source 18 of a temperature-exchange liquid such as oil or water, supplies this liquid to the forward end portion of the support, which support is oblong and has its longest dimension arranged axially of the tape run. The delivery of the liquid from the source 18 is to the upper surface of the support 10 directly below the tape 12, and the liquid so delivered spreads in a thin film in a minute gap between the upper surface of the support and the tape by capillary action, the spreading of the film being in the direction of the rear portion of the support or the delivery end thereof. The spreading of the film in this direction is enhanced by travel of the tape 12 over the support in the direction of the take-up roll 16.

Turning now to the details, the tape support 10 may be constructed of brass for example and has a planar tape support surface which may be conveniently coated with chrominum. This surface should be uniform and smooth. The tape, which may be of Mylar film having a thickness of generally of 4 to 9 mils by way of example and a width of three-fourth inch, is provided support by the last-mentioned surface the width of which may approximate that of the tape as shown. Also as shown, the base of the support may be wider than the last-mentioned surface. The temperature-exchange liquid may drain off the rear end of the support 10, or as illustrated, the support may be provided with an upwardly extending opening therethrough at atmospheric pressure forming a discharge port 20 in the support for the temperature-exchange liquid, from which port the liquid is conveniently disposed of in a manner not shown. The port 20 extends transversely of the support throughout a dimension at least as great as the wdith of the tape. The film 22 of temperature-exchange liquid on the support, in contact with the tape, extends between the forward end portion of the support and the discharge port 20. In leaving the tape support, the tape may travel over a surface which is rounded, as at 24, and extends rearwardly from the port 20.

As shown in FIG. 1, at the forward portion of the tape support in the area of the tape receiving part thereof, the tape supporting surface is depressed, as at 26, and rearwardly of such depressed surface a transverse notch 28 is provided in the tape support surface. Extending across the tape support surface in notch 28 is a portion of a wick 30 which wick extends from the temperature-exchange liquid in the reservoir 18 to convey such liquid to the tape support surface in the form of the invention which is illustrated only by way of example and not by limitation. As illustrated, the tape in its travel from the supply roll to the take-up roll is deflected by and travels over the wick 30.

In such deflection in the tape, there is created directly forwardly of the wick an air gap 31 between the tape and the support 10 of a size sufficient to preclude the passage of the temperature-exchange liquid in a forward direction by capillary action. The construction and arrangement of the tape support and the run of the tape is such that the temperature-exchange liquid is drawn by capillary action only in a rearward direction from the wick 30.

The wick 30 is preferably of a cross sectional dimension such as to rise in the notch 28 to a level as high as or above the level of the tape support surface extending rearwardly of the wick. In this rearward area, the tape support surface is grooved longitudinally by a plurality of transversely spaced notches 32 to provide lands 34 for support of the tape. Two lands extend below the respective side edges of the tape and the remaining lands 34 are spaced therebetween transversely of the support. By way of example, the notches 32 which provide the lands 34 may be 0.004 inch in depth and 0.010 inch in width, and the lands may be five in number. The notches 32 originate adjacent the transverse notch 28 and extend rearwardly therefrom to the discharge port 20 for the temperature-exchange liquid.

A hold-down device for the tape, indicated generally at 36, serves to hold down the tape at locations both forwardly and rearwardly of the wick notch 28. As shown in FIGS. 1 and 2, the hold-down device 36 is supported between uprights 38 and 40 in fixed relation to the tape support 10 in a manner to straddle the tape, and is swingable on the support 38 to a position in which it clears the tape path for threading of the tape. The device 36 may be structured of suitably hard plastic material and provided with depending ears 42 which bear down on the tape 12 forwardly of the notch 28 in the region 26 of the tape support surface. A pair of laterally spaced resilient tabs 44 on the hold down device extend rearwardly for downward pressure on the tape rearwardly and in proximity to the notch 28.

A coil 46 of wire is located in the support 10 a distance below the tape support surface and is provided with ends projecting from the support. The wire may be solid to conduct an electrical current through the coil to generate heat for heating the lands 34 of the tape support, or if desired the wire may be hollow for the passage therethrough of a coolant to cool the lands 34. A temperature-sensing element 48 is located in the support 10 to sense the temperature of the support, and the element 48 controls by conventional means, not shown, the heating or cooling effect of the coil 46.

As previously indicated, the delivery of the temperature exchange liquid from the source 18 is such that the liquid is ultimately introduced between the lands 34 of the tape support and the tape 12, and the liquid so delivered spreads in a thin film in the mixture gap between the upper surface of the lands and the tape by a capillary action, the spreading of the film being in the direction of the rear portion of the support. The spreading of the film in this direction is enhanced by travel of the tape 12 over the support 10 in the direction of the take-up roll 16. The last-mentioned roll may be driven intermittently or continuously.

The tape 12 closely adheres to the filmed lands 34 and such adherence effectively tends to eliminate any tendency of the tape to curl. By reason of the close adherence of the tape to the filmed support 10, and by reason of the presence of the thin film of temperature exchange liquid between the temperature-controlled support 10 and the tape 12, there is a very effective temperature-exchange between the support and the tape. While the temperature-controlled support and the tape run thereover, are illustrated as being horizontally oriented it will be understood that the support and the tape run may be forwardly or rearwardly inclined to the vertical if desired or it may be otherwise oriented.

As previously indicated, the function of the grooves 32 in the tape supporting surface of the support 10 is to somewhat relieve adhesion of the tape 12 to such surface to enable the tape to move with sufficient freedom over the support on advance of the tape by the take-up roll 16. By determining the proper number and location of such grooves excessive adherence of the tape to the support may be avoided.

Aforementioned U.S. Pat. No. 3,650,698 issued Mar. 21, 1972 illustrates one use of the apparatus hereindescribed. In the last-mentioned patent there is illustrated and described a horizontal tape run over a temperature-controlled support for the tape in tests to determine coagulation rates of human blood specimens. The tape is advanced intermittently. A blood specimen in the form of a droplet is deposited on the tape on which a substance has been previously applied. After the deposit of the droplet, the tape is advanced carrying the specimen to a station at which a reagent is added to the specimen on the tape. A time-dependent temperature-responsive reaction then takes place in the specimen on the tape, and the specimen is advanced with the tape to another station at which the end of the reaction is sensed to indicate the coagulation time of the blood specimen.

The method and apparatus of the present invention for controlling the temperature of a tape in a tape run is an improvement on that shown in the aforesaid U.S. Pat. No. 3,650,698. Moreover, the present invention has other applications such, for example, as controlling a temperature-responsive reaction in a tape or for another type of temperature-responsive reaction to take place in materials supported on a tape.

While only one form of the invention has been illustrated and described herein, it will be apparent especially to those versed in the art, that the method and apparatus for controlling the temperature of a tape in the tape run may take other forms and are susceptible of various changes in details without departing from the principles of the invention.

What is claimed is:

1. A method of controlling the temperature of a tape element in a tape run for a temperature-responsive chemical reaction of substances supported on said tape, utilizing a tape support element having a tape support surface elongated in the direction of the tape run, said tape support surface having a tape-receiving part spaced from a tape-delivery part thereof, comprising:

intimately supporting said tape element by said support element, with the surface of said tape element opposing said support surface;

relieving said support surface longitudinally thereof to limit adherence of said tape element to said support element;

controlling the temperature of said support surface for said temperature-responsive reaction;

introducing a relatively small quantity of a temperature-exchange liquid between said elements in proximity to said tape-receiving part to spread by capilarity in a thin film in the direction toward said tape-delivery part; and moving said tape element in a direction toward said tape-delivery part, thereby enhancing the spreading of said thin liquid film in said direction.

2. A method as defined in claim 1, further including holding down said tape element on at least a portion of said filmed support surface.

3. A method as defined in claim 1, wherein: said introduction of said liquid is along a dimension extending in a direction transversely of said tape element.

4. A method as defined in claim 1, wherein: said introduction of said liquid is by a wick extending from a source of said liquid, said wick being in contact with said tape element along a transverse dimension of the latter.

5. A method as defined in claim 1, wherein: said introduction of said liquid is by a wick extending from a source of said liquid, said wick being in contact with said tape element along a transverse dimension of the latter, said wick also being in contact with an edge of said support surface along a dimension transversely of said surface.

6. A method as defined in claim 1 wherein: said controlling of the temperature of said support surface is for controlling the application of heat thereto.

7. A method as defined in claim 1, wherein: said controlling of the temperature of said support surface is for controlling the application of a cooling effect thereto.

8. A method as defined in claim 1, wherein: said movement of said tape element is intermittent.

9. A method as defined in claim 5, further including holding down said tape element at each side of said wick.

10. In apparatus for controlling the temperature of a tape element in a tape run, comprising: a support element having a tape-supporting surface elongated in the direction of the tape run for cooperation with a surface of the tape element, said surface having a tape-receiving part spaced from a tape-delivery part thereof, means for directing the tape run closely over said surface, means controlling the temperature of said support surface, means for introducing a relatively small quantity of a temperature-exchange liquid between said elements in proximity to said tape-receiving part to spread by capillarity in a thin film in a direction toward said tape-delivery part, and means moving said tape element in a direction toward said tape delivery part, thereby enhancing the spreading of said film in said direction: the improvement wherein said support surface is provided with a plurality of tape-supporting lands intermediate said tape-receiving part and said tape-delivery part, said lands being arranged lengthwise of said support element in spaced relation to each other transversely of said support element.

* * * * *